United States Patent [19]

Govett

[11] Patent Number: 5,761,507
[45] Date of Patent: Jun. 2, 1998

[54] CLIENT/SERVER ARCHITECTURE SUPPORTING CONCURRENT SERVERS WITHIN A SERVER WITH A TRANSACTION MANAGER PROVIDING SERVER/ CONNECTION DECOUPLING

[75] Inventor: Ian Robert Govett, Richmond, Vt.

[73] Assignee: International Business Machines Corporation, Armonk, N.Y.

[21] Appl. No.: 610,943

[22] Filed: Mar. 5, 1996

[51] Int. Cl.[6] .................................................. G06F 15/16
[52] U.S. Cl. ................ 395/684; 395/200.33; 395/200.49; 395/200.57; 395/672; 395/674; 395/675
[58] Field of Search .................. 395/200.03, 200.09, 395/200.12, 684, 200.33, 200.49, 200.57, 672, 674, 675

[56] References Cited

U.S. PATENT DOCUMENTS

| | | | |
|---|---|---|---|
| 5,249,290 | 9/1993 | Heizer | 395/675 |
| 5,339,392 | 8/1994 | Risberg et al. | 395/333 |
| 5,553,242 | 9/1996 | Russell et al. | 395/200.57 |
| 5,581,552 | 12/1996 | Civanlar et al. | 370/396 |
| 5,603,029 | 2/1997 | Aman et al. | 395/675 |

*Primary Examiner*—Kenneth S. Kim
*Attorney, Agent, or Firm*—Whitham, Curtis, Whitham & McGinn; Alison Mortinger

[57] ABSTRACT

A transaction manager intercepts all requests for service from any of a plurality of clients, establishes connections independently of task requests and assigns available servers to the requests in the order the requests are received in order to provide equitable distribution of service resources over an increased number of client/server connections. Preferably, the transaction manager provides for starting at least one server independently of any request, direction of all client requests for server connections to a transaction manager independently of any server, placement of task requests in a queue and starting and stopping additional servers based on queue length.

15 Claims, 5 Drawing Sheets

CLIENT/SERVER ARCHITECTURE SUPPORTING CONCURRENT SERVERS WITHIN A SERVER WITH A TRANSACTION MANAGER PROVIDING SERVER/ CONNECTION DECOUPLING

BACKGROUND OF THE INVENTION

1. Field of the Invention

The present invention generally relates to distributed data processing systems and networks and, more particularly, to the development of client/server connections between processors of such a distributed data processing system.

2. Description of the Prior Art

Data processing systems allowing communication between a plurality of data processors connected in a network have been known for many years. Early instances of such network systems generally involved communication between any of a plurality of terminals and a host processor which maintained a central data storage facility and handled the retrieval of information therefrom. As storage capabilities and processing power of small data processors has increased, however, it has become common to arrange networks such that data storage and processing is shared between at least some of the data processors connected to the network, avoiding the need for a large central data storage facility. Inquiries or requests for data and associated data processing can be directed to different data processors and has led to the development of protocols which allow one data processor connected to a network to become a client of another processor known as a server. Such requests need not be limited to requests for data and should be understood to include any type of data processing or service which the server is capable of providing. Basic operations performed by such protocols are establishing a connection between client and server, processing a request and terminating the connection. Requests which can be processed by a server are generally provided in a software application on the server which is referred to as a service.

The processing of a request, generally referred to as a remote procedure call (RPC), may take a significant amount of time and also includes the processing time overhead of establishing a connection and terminating the connection; both of which are complicated by the protocol necessary to establish the client/server relationship. Depending on the server implementation, the amount of processing time required, including the time for processing connection and termination requests from plural clients, increases the likelihood that a client making a request will be placed in a wait state (e.g. the request placed in a queue by the server or some system management arrangement), delaying processing of the request. Any such delay in processing of a request compromises the usefulness of the system, regardless of economies which might be theoretically derived from the network.

The usefulness of client/server relationships in a data processing system has been improved in significant degree by the development of plural, identical, servers operating concurrently on the same processor to increase the number of potentially available servers. This process is equivalent to the concurrent running of plural applications but where all such concurrently running applications which provide the same service are identical. Nevertheless, the communication protocols remain complex and are potentially limiting to the overall functionality of the system.

For example, a widely known and used RPC facility developed by Sun Microsystems (referred to hereinafter as SunRPC) has been used on many operating systems and hardware platforms for many years. SunRPC is a set of programming libraries and tools which assist a programmer with the development of client/server applications. However, even though plural concurrently running servers may be developed on a single processor, the SunRPC does not support concurrent servers with respect to requests of any client. For example, consider the scenario in which a client may have plural requests to process. Under known RPC facilities such as SunRPC, the client and server are bound to each other at the time the connection to the server is established. While plural requests could be processed by the server without terminating and re-establishing the communication link, the requests must be processed iteratively in sequence by the same server. Conversely, for a single client to obtain the advantage of concurrent processing by plural available servers, each request would carry the overhead of establishing a separate communication link to a specific server since each server, when started, is separately registered and a separate communication link must be established with each such server. Additional time is also required to start each new server process. Therefore, a client cannot exploit the full capability of the available system due to the necessity of either sequential processing or the incurring of substantial processing overhead.

Considering the same example further, but adding the possibility that another potential client makes a request during processing of requests (either serially or concurrently) from an existing client. For the additional request to be concurrently processed by a concurrently available server, the registration of the service requested and available from the server must be separately provided for the client. This is done in the SunRPC facility by a so-called portmapper ("Portmapper" is a trademark of Sun Microsystems), resident on the server. Separate registration also contributes to the overhead involved in establishment and termination of the communication link to an available server since at least an address (e.g. a port number) of an available server must be provided to the client before an operation to establish a communication link can be initiated.

In the event that no server is immediately available (as is likely in networks of current size having five-hundred or more potential clients) the request might cause termination of another communication link at the completion of a request (causing remaining requests from the client previously using the terminated link to be placed in a queue) or cause a wait state for an extended period while the request from the new client is placed in a queue awaiting an available server. In either case, there is no provision in any known RPC facility for assuring that RPCs from plural clients will be serviced in an equitable or timely manner by a plurality of servers and, during processing of any sequence of RPCs, including connection and termination requests, from any client, the client and one or more servers remain tightly bound. For example, with SunRPC, the portmapper does not carry status or availability information for any server which is registered with the portmapper and the address or port number provided to a potential client is substantially random and may be that of a server processing requests from another client when other servers are available. By the same token, SunRPC does not provide for requests of any particular server to be processed in order. The only known potential solution to improving timeliness of request processing is to spawn a new server for each request which, of course, implies substantial processing overhead and may easily cause the hardware capacity of the server processor to be exceeded.

Thus it is seen that existing protocols for establishing client/server relationships require substantial processing overhead, limit the flexibility of assignment of servers to clients, limit the server capacity which may be assigned to a client and fail to provide equitable and timely processing of requests from plural clients. In summary, while servers may be readily multiplied, the processing capacity of such an increased number of servers may not be fully exploited and provided to clients by known RPC facilities. Other potential solutions, such as addition of a communication manager to direct communications to various ones of running servers also increases the overhead associated with the connections, tightly binds client and server at the time of connection and may allow running servers to be idle while preventing further connections to communicate requests from additional clients.

SUMMARY OF THE INVENTION

It is therefore an object of the present invention to provide a system architecture which supports the development of concurrent servers for one or more clients.

It is another object of the present invention to provide for timely and equitable processing of requests from a plurality of clients which may exceed the number of available servers.

It is a further object of the invention to provide an arrangement to provide a simplified communication between network connected processors which remains compatible with known RPC protocols.

It is yet another object of the invention to provide decoupling of one or more servers from the process of establishing connections between a client and the processor providing a requested service to thereby permit maintenance of an increased number of client/server connections.

In order to accomplish these and other objects of the invention, a method of performing a remote procedure call on a data processor is provided including the steps of starting a server providing a service on a data processor independently of a remote procedure call, establishing a connection between a further data processor and the data processor, receiving at least one request for a task included within the service over the connection, and assigning an available server to a request in order of receipt and independently of establishing a connection.

In accordance with another aspect of the invention, a transaction manager for a data processing network is provided including an arrangement for starting a server providing a service on a first data processor, an arrangement for establishing a connection between a second data processor and the first data processor independently of a server, an interface for receiving a request for a task included within the service, and an arrangement for assigning an available server to said task in order of receipt independently of said means for establishing a connection.

The transaction manager in accordance with the invention operates to achieve compatibility with existing RPC facilities while supporting parallel processing of client requests by registering the transaction manager with a portmapper or client rather than registering a running server, to thus decouple the servers from the process of establishing connections and allowing the assignment of requests to servers independently of the client connections. Flexibility and efficiency of the system on which the invention is implemented can be expanded through provision for processing of administrative requests and representation of client requests by socket handles.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
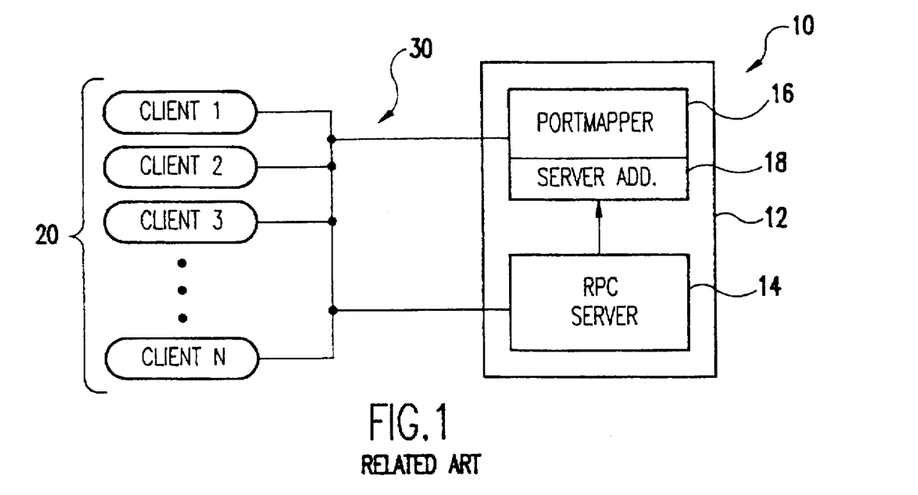
FIG. 1 is a high-level schematic diagram of a representative RPC architecture.

Referring now to the drawings, and more particularly to FIG. 1, there is shown a representation of a system architecture 10 in accordance with the SunRPC facility which is considered to be representative of known RPC facilities. It should be understood that while the SunRPC facility is known and in widespread use, FIG. 1 is a high-level schematic depiction limited to the level of detail which will facilitate an understanding of the invention since the details of the SunRPC facility and other similar facilities are unimportant to the practice of the invention. For the same reason, no portion of FIG. 1 is admitted to be prior art as to the present invention.

In FIG. 1, network 30 interconnects a plurality of processors 20, functioning as clients, with processor 12 on which the SunRPC facility and a service application is resident and running. It should be understood in this regard that any or all of processors 20 could but need not have the capability of functioning as servers for the same or a different service and that processor 12 could function as a client if another server is present. All that is necessary to provide the function of a server on any processor is a resident RPC facility and service application and the processing power to run them.

The SunRPC facility establishes RPC server 14 and portmapper 16 on processor 12. That is, the RPC server and portmapper are established using RPC protocols such as the SunRPC facility. These functional elements are representative of similar functional elements of other RPC facilities and will be embodied by logic, registers, particular memory address blocks and the like in accordance with the configuration specified by the RPC facility; the specifics of which are not important to the practice of the invention. Such functional elements could also be provided, in whole or in part, by special purpose data processing circuitry and dedicated hardware.

The portmapper 16 is preferably a program which provides a registration service for each server in response to a server request when the server is started and maintains a description of the tasks which may be requested within the service and the address 18 of the server providing the service which includes those tasks. Thus, portmapper 16 is also capable of providing a look-up service for clients, preferably in the form of a look-up table. The portmapper 16 also maintains the RPC program number and version used by clients to establish network connections.

The RPC server is constructed by the software developer to perform a specific service (e.g. set of tasks) which is uniquely identified using an RPC program number and version number. When an RPC server is started (thus becoming available to a client) the server registers with the portmapper 14 and then waits for connection requests and subsequent task requests from client processors.

The RPC clients (e.g. client 1, client 2, client 3, ....., client N) are constructed by the software developer to have the capability of sending RPC requests for specific tasks to servers capable of performing them. The client application requests connection information from the portmapper 16 and uses that information to request a connection to the RPC server 14; after which one or more requests can be made to the server over the connection held by the server 14.

In operation, the server and client are tightly bound at the time of the connection and the connection remains until released at the completion of one or more requests. If the server is in use, no further connections can be made. (It should be noted that since each server is separately registered with the portmapper and a connection request is made to a specific server, only one server need be considered. Under known RPC facilities, a request from a client blocks waiting in the server, resulting in a substantially random order in which requests from different clients are processed.) Some queueing or communication interrupt arrangement could be provided at the portmapper level (e.g. by queueing connection requests so that server information is provided to requesting clients in the order received) in the form of a communication manager but it is important to an appreciation of the invention that such management is not a function of the portmapper. Also, as pointed out above, all requests from any particular client must be iteratively processed by the server to which connection has been made.

While, in theory, a connection from a client to each of a plurality of servers could be made to service different requests, a separate connection to a particular server would be required for each request or sequence of requests to be concurrently processed. However, this requires the additional processing overhead of establishing the connections, as noted above, as well as much increased processor capacity to invoke sufficient numbers of servers as separate identical processes on a single machine. Further, if a client is allowed to establish plural connections to plural servers, each of those connections results in tight binding of a particular set of requests from the client with a particular server. Moreover, provision must be made for associating the returned information with a particular request or set of requests. Furthermore, it would be difficult to avoid the result that a client might seize as many servers and processor capacity as may be available at any time or as may become available during the processing of a sequence of requests, causing service to other clients to be prevented or unduly waited.

Figure 2:
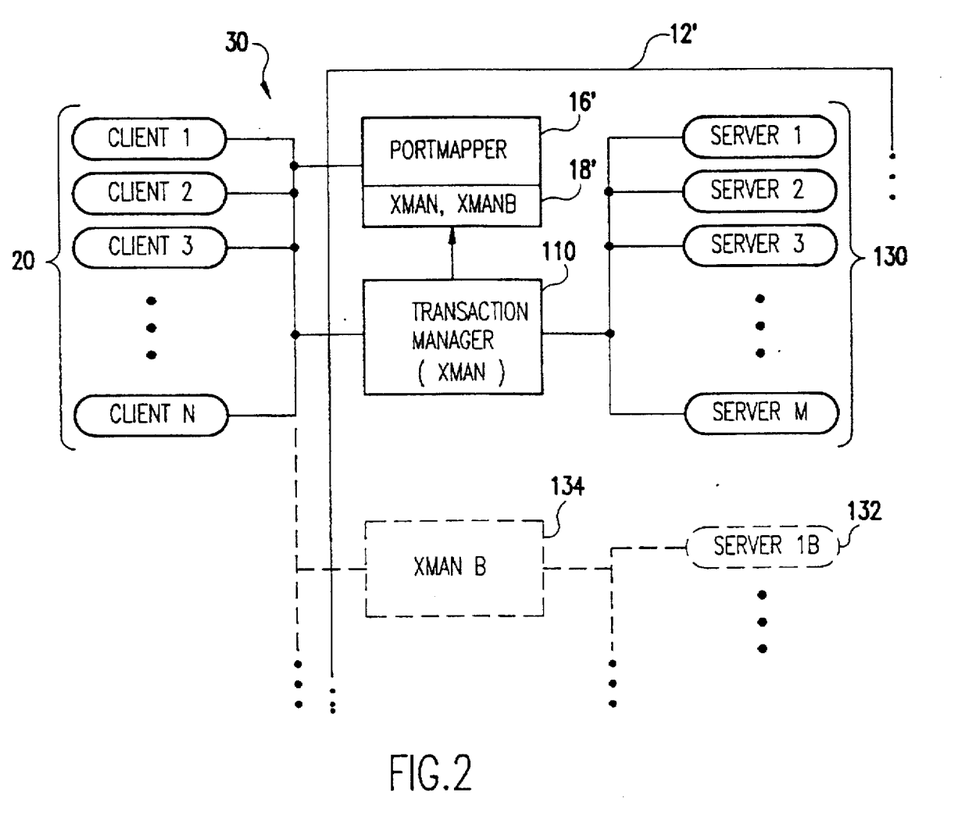
FIG. 2 is a high-level schematic diagram representing the network architecture including the present invention.

Referring now to FIG. 2, the architecture 100 of the present invention will be discussed. Network 30 and a plurality of clients 20 are present as in FIG. 1. A portmapper 16' is provided, as described above, but with the difference that the server address (e.g. port number) provided to the client to establish a connection will be the address of a transaction manager 110, sometimes referred to hereinafter as XMAN.

If only a single service is provided albeit as plural servers this will trivially be a single address (e.g. program number of the application providing the service) which could advantageously be stored at each client, as will be discussed more fully below. In this sense, the retention of a portmapper 16' is essentially an incident of maintaining compatibility with existing SunRPC facilities and other RPC facilities. However, the portmapper does maintain the capability of receiving and maintaining registration of the service when a server is started and provides some flexibility and convenience when different services are available over the network or when a service may be interrupted. In this regard, it is contemplated that the system may employ two or more different services and the architecture of the invention replicated (e.g. as shown at 132, 134) which would require provision of additional addresses 18' (e.g. of XMAN B). Of course, depending on the hardware capacity of the server processor, two or more different services (each potentially employing plural servers) may be provided on the same processor with XMAN 110. In either case, it is only necessary that the portmapper be able to provide different addresses such as unique program numbers appropriate to the requested task.

Figure 3:
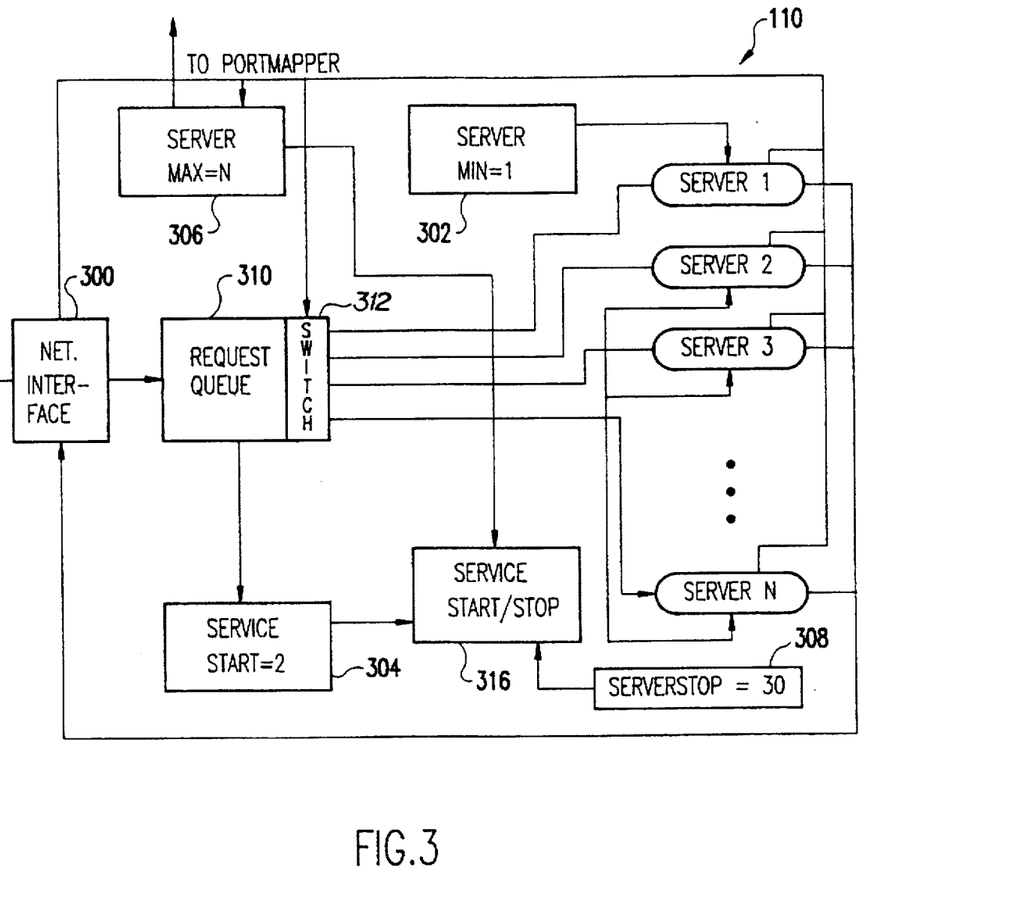
FIG. 3 is a schematic block diagram of a preferred form of the transaction manager of the invention.

Referring now to FIG. 3, the basic elements of the transaction manager are shown. Again, these elements are preferably developed by software but could be implemented in hardware or a combination of both hardware and software. Four registers 302, 304, 306 and 308 are provided to store the basic configuration values for the transaction manager 110. Register 302 establishes the minimum number of servers which will be running in the absence of requests and is arbitrarily set at 1. Register 304 establishes the number of waiting requests which will be allowed prior to starting an additional server and is arbitrarily set at 2. Register 306 stores the maximum numbers which will be allowed to run at any time consistent with the capacity of processor 12'. Recalling that each server is essentially a software application which takes a finite amount of processing overhead to load, register or counter 308 contains a parameter for controlling how often servers will be stopped and is, for example, set at thirty seconds based on a balancing of computer overhead contributions, convenience of users (thirty seconds will often be transparent to users in view of current network access times), average request execution time and the like. All of these parameters are freely configurable. It should also be noted that while the starting of servers is preferably a function of queue length, a similar parameter may be advantageously used in some circumstances to control frequency of starting of servers when starting multiple servers, as will be described below.

Bidirectional network communications enter and exit the transaction manager 110 through network interface 300. For purposes of this explanation, it is assumed that this network interface can discriminate a connection request from a task request. Generally, this is accomplished based on the port number provided to the client by the portmapper and is especially facilitated in accordance with the invention since the port number will be the program number of the service. Regardless of how this discrimination is done, when a connection request is received, a signal is sent to the portmapper 16' so that the address of the transaction manager 110 (e.g. a program number of a service running on the server processor) can be sent to a client and/or other operations performed to establish a communication link. In distinction from the architecture of FIG. 1, the servers 130 are not involved in this process.

When the transaction manager is started, server 1 is started under control of register 302. When a request is then received, it is temporarily directed to request queue 310 and, since server 1 has been started and is presumably available, switch 312 immediately directs the request to server 1 where the request is processed and the result returned to the client through network interface 300. It should also be understood that, as a matter of performance, it is preferable that an alias representative of the request, known as a socket handle, be placed in the queue and passed to the server to identify the request to be processed rather than performing a store-and-forward of the request itself. (The transaction manager has no need for the information contained in the request or any other specifics of the request, particularly since the program number of the service capable of processing the task has already been provided and the connection to the transaction manager established thereby. This feature of the preferred embodiment of the invention is important to the applicability of the invention to other RPC facilities and systems such as the so-called transmission control protocol/internet protocol (TCPIP) and the open software foundation/distributed computing environment (OSF/DCE) protocol, as will be further discussed below.)

Now, suppose that during the processing of the request in server 1, a second request is received from the same or another client. The second request is placed in the request queue 310 in which it waits since no other server is available. If a third request is then received from the same or another client while server 1 continues to process the first request, however, the queue length equals the server start value in register 304 and a signal is sent to the service start/stop element 316 which will then start server 2. When server 2 thus becomes available, the second request is passed thereto through switch 312. Switch 312 is responsive to the status of each server which, assuming it has been started, to switch 312 and server max register 306. (There is no need to report the status of the individual servers to the portmapper 16', as in the SunRPC facility, other than the starting of the first server so that the portmapper will know a particular service is available. Once the service is available, the portmapper need only supply the XMAN address when a connection is requested and the server assignments to requests will be handled by the XMAN.)

The third request will then be advanced in the request queue 310 which is preferably in the form of a first in, first out buffer but a further server will not yet be started since the server start value exceeds the queue length. If a fourth request is received before the processing of the first or second request is completed, server 3 will be started in the same manner as discussed above. When processing of any request is completed and the result returned through network interface 300, the server becomes available to receive the next request (e.g. the third request) from the request queue.

The server communicates the result of the request processing directly to the client as an incident of the request and without any involvement of XMAN 110 other than to indicate availability of the server to process another request. This is also true for connection and termination requests in which the "result" returned directly to the client is generally an acknowledgement and authorization for a connection and an acknowledgement and return code for a termination. If there is no request in the request queue, the server becomes idle but is not stopped until a period of time (e.g. thirty seconds) has elapsed as established by the value in register or counter 308.

It is also convenient to provide for a delay in starting servers of about the same amount of time or in dependence on the length of the request queue being greater than the value specified in register 302 in view of the processing overhead required for starting a server. For the same reason, it is convenient to set the value in register 304 at more than one even though this implies that less than the full capacity for concurrent server use is obtained. If, for example, thirty seconds is required to start a server, there would be no gain in throughput from setting the service start value to 1, regardless of the service stop value. By setting the service start value to two (or more) and the service stop value similar to the time required to start a server, a gain in processing throughput is, in fact, achieved since the request remaining in the request queue 310 will be immediately passed to any available server upon completion of any prior request.

It should be noted from the foregoing that there is no binding of clients to the servers since the requests are processed in the sequence they are received. Therefore, the servers are, in effect, unaware of the client identity (except for the destination of the results) and XMAN is completely transparent to the RPC clients which have had requests sent to servers in a manner completely consistent with client operations under the SunRPC facility.

By the same token, the servers may concurrently process requests from any client or group of clients at the same speed and the constraint of iterative request processing is removed from the RPC facility. Similarly, the association of servers with requests rather than with connections reduces the number of servers waiting for requests if the number of servers exceed the number of requests being processed. Thus, the portion of the processing power of processor 12' which is allocated to server operation is also kept at a minimum.

Further, many more connections may be established and maintained than may be sending requests to the server at any given time. More importantly, however, concurrent processing of a sequence of requests from any single client is provided without the overhead of establishing additional connections and, at the same time, service is optimized to each client while a mechanism is provided for equitably providing request processing to all client requests in a timely fashion with reduced complexity of registration (since only the availability of a transaction manager associated with the service containing the requested task is necessarily monitored by the port mapper). Thus the meritorious function achieved by the invention is much different and much more comprehensive and beneficial than could be achieved by the addition of a connection manager which might direct incoming requests to various running servers and which would still be limited by the tight binding of a client and a server at the time of connection.

While a specific illustration of the operation of the invention has been provided above, the preferred operation of the invention is embodied in the following pseudocode:

```
BEGIN
    Initialize XMAN
        Start logging process
        Begin start of minimum number of servers
            for the service
        server_available = 0
        service_queue = 0
        init = 0
    DO FOREVER
        wait for requests from clients or
            servers, timeout after <t> seconds
        for each request DO
            SWITCH(request_type)
                CASE CLIENT_CONNECT
                    accept client connection
                CASE SERVER_CONNECT
                    accept server connection
                CASE SERVER_REQUEST
                    call process_server
                        _request
                CASE CLIENT_REQUEST
                    add client request to the
                        service_queue
                    service_queue
                        = service_queue + 1
            END-SWITCH
        END-for
        /*
         * process client requests from the
         * queue
```

```
    */
WHILE server_available > 0 AND
service_queue > 0 DO
        give client request to the server
        server_available=server_available-1
        service_queue=service_queue-1
END
/*
 * check for need to start more servers
 */
IF service_queue_length>server_start AND
         < server_max
        start another server for this
            service
END IF
/*
 * check for need to stop idle servers
 */
FOR each server running DO
        If server_idle_time>server_stop AND
                #_of_servers>server_min
            stop server
            server_avail=server_avail-1
        END
    END-for
    END-DO
END
```

The preferred procedure for registering a server when a server is started is embodied in the following pseudocode:

```
PROCEDURE process_server_request()
BEGIN
    SWITCH (server_request_type)
        CASE SERVER_REGISTER
        /*
         * each server sends REGISTER when
         * starting up. The first
         * registration is passed to the
         * portmapper.
         */
        IF (service is not registered) then
            register RPC service with
                portmapper
        END IF
        CASE SERVER_IDLE
        /*
         * server sends IDLE when request
         * completed,
         */
        server_avail = server_avail + 1
    END-SWITCH
END
```

Figure 4:
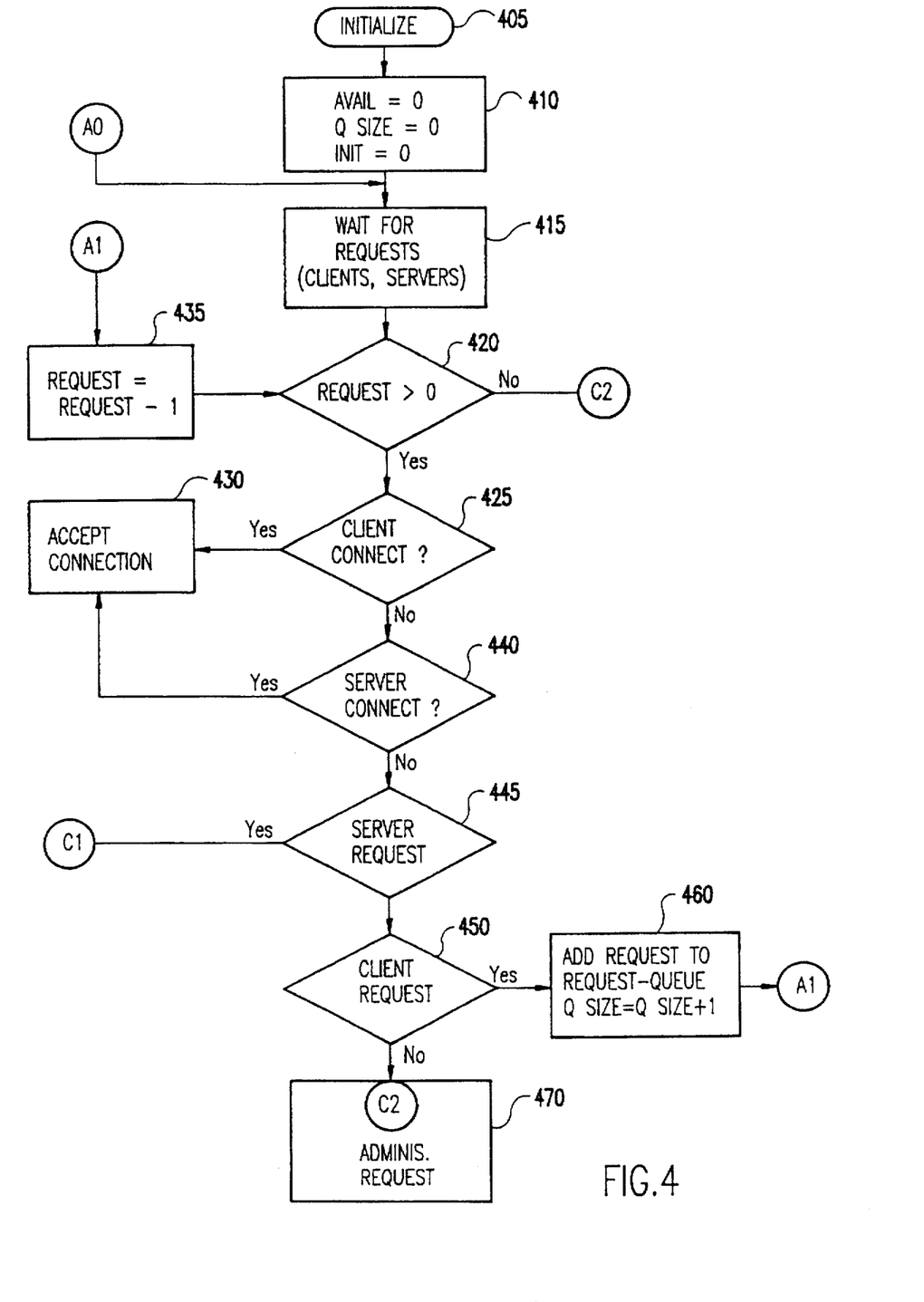
FIGS. 4, 5 and 6 are flow charts together depicting the operation of a preferred form of the present invention.
Figure 5:
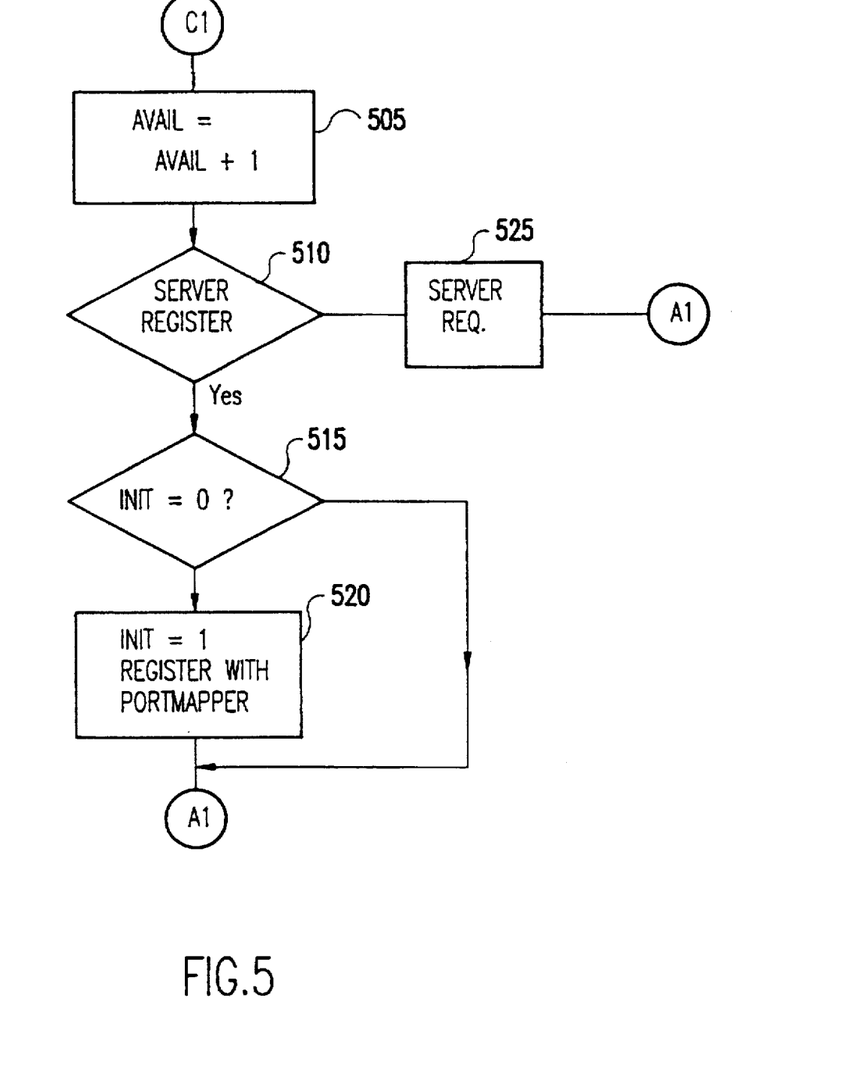
Figure 6:
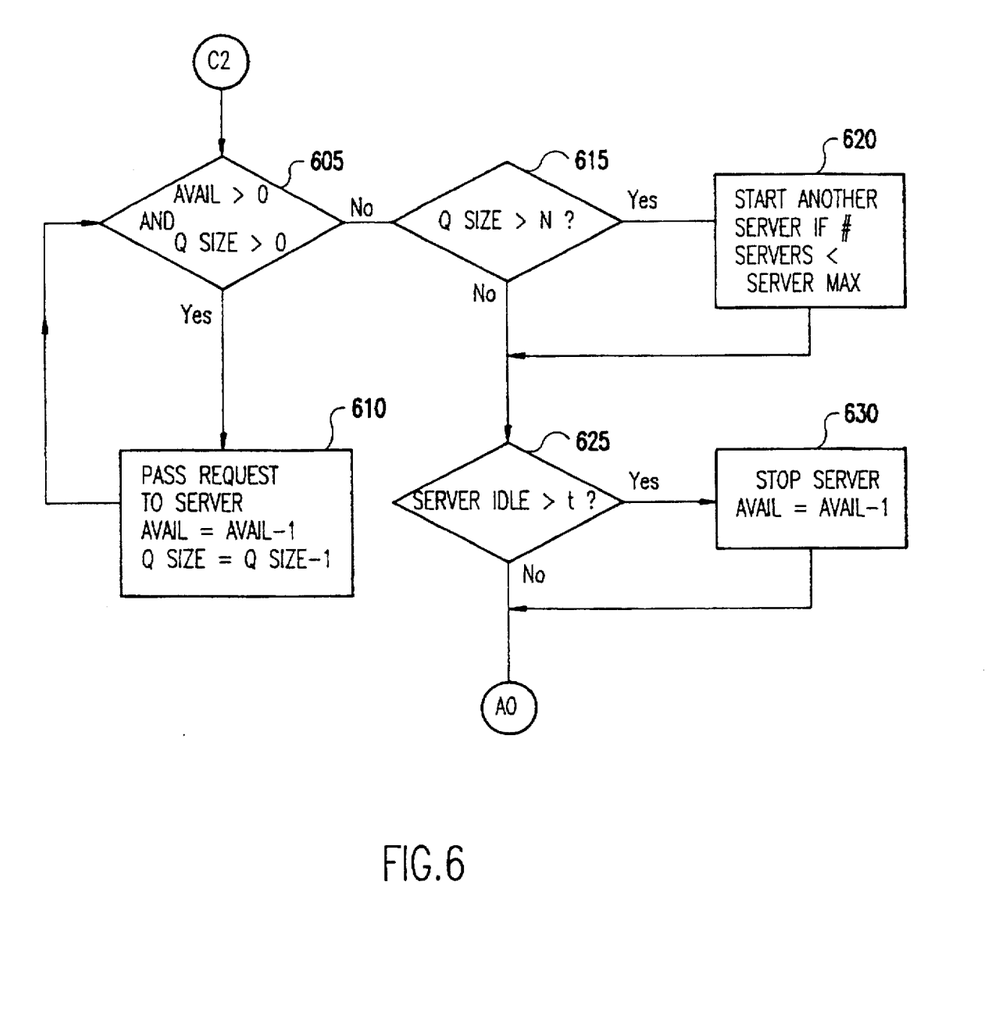

The above pseudocode embodies a process illustrated in the flow charts of FIGS. 4, 5 and 6. It is to be understood 50 however, that the methodology depicted in FIGS. 4, 5 and 6, while representative of the preferred methodology, is intended to convey an understanding of how preferred functions of the invention can be achieved and that numerous variations thereon will be apparent to those skilled in the 55 art in view of the following discussion. Further, it is to be understood that the methodology depicted is simplified in the interest in conveying an understanding of the invention and its function and no consideration is given, in this depiction, to the relative efficiency of programming or 60 execution of a program embodying the methodology or any variation thereof as embodied in a program written in any particular programming language. For example, while it is preferred in the interest of processing efficiency, to place a socket handle in the request queue instead of the request 65 itself, the use of a socket handle in this fashion is a perfecting feature of the invention and is not requisite to the operability of the invention or important to the principles of operation thereof. It is also to be understood in this depiction, that some delay will exist between all processes depicted and that the state of requests may change between the execution of any depicted steps. The following description of FIGS. 4-6 should also be considered to provide additional commentary on the above pseudocode.

Referring now to FIG. 4, the process in accordance with the invention begins with initialization of XMAN 110 which may but need not include a start of logging operations which may be useful for error recovery of the like. The starting of an initial minimum number of servers will be begun in accordance with the "server min" configuration value 302 (FIG. 3). These operations are considered as being included in "initialize" step 405. Since this processing takes a significant amount of time, the number of available servers is set to zero and this value will be incremented as each server start operation is completed. Also, the queue size or length variable is set to zero and another variable, "init", which is convenient to carrying out registration of XMAN 110 with portmapper 16', 18' and for compatibility with existing RPC facilities, such as SunRPC, as will be discussed in connection with FIG. 5, is, likewise, set to zero at 410.

XMAN 110 then waits for requests at 415 which may be from either a potential (since no connection to XMAN has been made) client or a server. Branching function 420, based on the number of requests which may be received within a short period of time is considered convenient for controlling processing through a plurality of different loops in order to service requests in order giving priority to acceptance of connections, establishing priority between client and server for similar types of requests and giving priority to acceptance of requests and establishing an order between request before assignment of requests to servers. Thus, the process will branch to C2 only when all incoming requests have been placed in the request queue (requests=0).

When a request is received, the request variable is incremented so that the number of requests exceeds zero and the request is tested to determine if it is a client request (e.g. for connection, a task or a termination) or a server request (e.g. for registration). If the request is from a potential client, the first request will be for a client connection, detected at 425 and carried out (e.g. accepted) at 430, whereupon the number of requests is decremented at 435 and the process returned to 420 for branching to C2 for assignment of requests to servers and/or other processing such as starting or stopping of servers (if requests=0) or further acceptance of requests (if requests>0) at 420.

If the request is not for a client connection, the process of the invention tests the request for a server connection request at 440 which is issued as part of the server start operation and, if so, the connection is accepted at 430 in the same manner as a client connection request. The order of branching operations 425 and 430 is substantially arbitrary but priority of client connections is somewhat preferred since server connections affect the internal processing capacity and it is only important that additional server connections be accepted prior to assignment of requests to servers while responsiveness to client connection requests are generally much more numerous and affect user convenience.

As a final portion of the server start process a server request for registration will be issued and such a request is detected at 445 which causes branching to C1 and the registration process of FIG. 5, which will be discussed below. If not, a client request (e.g. for a task or termination)

will be detected at 450 and the request placed in the request queue and the queue size or length variable incremented at 460; returning to 420 for further processing through the loop formed by A1 and 435. While the invention may be practiced without processing of administrative requests, such capability greatly expands the flexibility and capabilities of the system on which the invention is implemented. Administrative requests may also be received either from a client or from within the server processor (e.g. an interrupt or for server processor housekeeping). Other administrative commands may be provided from an administrative interface which provides for processing of additional types of commands from a client such as for starting or stopping a service compatible with an operating system other than the operating system which the server processor is using, mirroring to provide servers on other processors connected to the network or server status or accounting/logging queries. Branching operations 425, 440, 445, and 450 respectively detect all the types of requests which are of any relevance to the client/server relationship and failure to detect a client request at 450 causes branching to process the administrative request at 470 thus providing priority over actual processing of the client requests but not over acceptance and ordering thereof for subsequent processing.

Returning now to branching operation 445, it was noted above that a server request is issued in a latter stage of starting of a server or upon completion of the starting of a server. It was also noted above that XMAN 110 (rather than individual servers) must be registered with portmapper 16', 18' when a server is running in order to provide service to a client. It was also noted above in connection with the XMAN initialization procedure that the variable "init" was set to zero. The registration of XMAN will now be explained with reference to FIG. 5.

Specifically, when a server (e.g. one of the number of servers specified by server min) has been started and can service a client request, it is necessary that XMAN (but not the individual server, as in SunRPC) be registered with the portmapper 16', 18'. Once XMAN has been registered with the portmapper, further registrations are unnecessary and, if done, could cause ambiguity or inefficiency of processing. Nevertheless, recalling that all servers providing a particular service are identical applications, the server start process at completion will issue a request for registration. The processing of FIG. 5 serves to provide the registration of XMAN only once, upon the initial request for registration by a server and to thereafter intercept further such requests (e.g. issued when additional servers are started in response to the request queue length). This is much preferable to providing separate, slightly differing server applications which must be started in a particular order, which must be individually stored and accessed and might potentially contain differences in the service provided as the applications are maintained and updated over time.

Detection of a server request for registration is detected at branching operation 445 and causes branching to C1 of FIG. 5. The variable indicating the number of available servers (e.g. maintained at 306 of FIG. 3) is incremented to indicate another server has been started and may be available. If the server request is for registration, as detected at 510, the "init" variable is evaluated at 515. If init=0, it is set to 1 and XMAN is registered with the portmapper. If init is already equal to 1, XMAN has been previously registered and the process of FIG. 5 exits to A1, 435 and 420 of FIG. 4. Similar exit to A1 is provided at 510 if the server request is not for registration upon being started, such as for controlling the input of tasks or error recovery interrupts.

Optionally, although not relevant to an understanding of the principles of the invention or necessary to its practice, other server requests could be processed at 525 in response to the same branching operation 510 prior to return to A1. For example, it has been found very useful to use this branching operation 510 to perform logging and accounting functions (such as may be queried by an administrative interface, alluded to above) for each server and to capture the time of last use of a server for comparison of idle time with the server_stop parameter.

It should be noted, in this regard, that an idle status of a server is done at operation 505 by indication of availability. In any case, this branching operation 510 provides sufficient processing priority over other processing (but not connection processing) to make sure that the servers operate satisfactorily when processing client requests and that server status is updated in a timely fashion prior to assignment of client requests to servers.

Returning now to branching operation 420 of FIG. 4, the process in accordance with the invention branches to C2 of FIG. 6 upon the requests variable being equal to zero, having being decremented at 435. If the number of available servers is greater than 0 and any requests remain in the queue as determined at 605, the next request in the queue is passed to an available server for processing and direct report of the result to the client and the number of available servers and queue length are decremented at 610. The process than loops back to 605 and repeats until the queue is empty or all servers have tasks passed to them. These alternatives are indirectly distinguished at 615 and 625.

If branching operation 615 determines that the queue length is greater than the server_start variable (N in FIG. 6) and thus the number of available servers is zero or less than the server_start variable, as XMAN is currently configured (and, hence, the queue size is non-zero) starting of another server is initiated at 620 if the number of servers running is less than the server_max variable, as XMAN is then configured. A time delay may be imposed on this process at 615 if desired. (Likewise, testing of the number of servers against the Server_max variable could be done at 615 rather than at 620, as depicted, if desired.) If a server is started or the number of servers equals server_max, branching operation 625 will, of course cause branching to A0 of FIG. 4 to continue processing. If starting of a further server has been initiated, this processing will include branching to FIG. 5 when the server has been successfully started, as described above, incrementing the number of servers available and again, in due course, branching to C2 of FIG. 6 for passing of a request to the newly started server.

If, on the other hand, the queue size or length is not greater than server_start, it is likely that a server is idle or will soon become so if no further client requests are received. If further client requests are, in fact, received, they are duly processed by accepting connections, processing server requests or placement of client requests in the queue, possibly causing starting of one or more further servers as described above. Otherwise, when the queue becomes empty and a task is completed to render a server idle, each server will be polled for an idle time value. If that value exceeds the server_stop variable, the server is stopped at 630 to maximize available processing capacity at the server processor 12' and the process of FIG. 6 exits to A0 of FIG. 4 to await further requests.

It should also be noted from the foregoing that the methodology of the invention is completely independent of the details of the RPC facility, such as the SunRPC facility, which establishes the client/server relationship. In particular, the methodology is completely independent of the manner in which connections are established and any arrangement provided in the RPC facility for establishing connections can be accommodated in much the same manner as discussed above. All that is required is the provision of the XMAN address (provided to portmapper 16', 18' by the process_server_request routine depicted in FIG. 5 and contained in the above pseudocode) in association with a requested task which the service corresponding to XMAN can provide; such as returning the XMAN address rather than a particular server address from the portmapper in response to a request for service from a potential client. Further, the decoupling of the connection process from a particular server allows requests to be queued and servers to be allocated to requested tasks in the order that requests are received; resulting in timely service and highly equitable allocation of service among clients while additionally allowing many more client connections to be maintained.

Additionally, as noted above, the establishment of connections is completely decoupled from the servers (e.g. by the loops at 425, 440, 445 and 450 (the latter through A1) and all communication protocols, accommodation of differing operating systems, logging services, authorization files, administrative interfaces and other matters of compatibility between client and server can be accommodated in known ways as incidents of the network communication over the connections established. Therefore the server is not required to accommodate any of these matters and the invention is thus made applicable to any operating system and communication arrangement. In view of the foregoing, it is seen that the invention provides support for concurrent servers for a single client without increase of communication overhead while providing timely service and equitable allocation of resources to all requesting clients. Further, the number of client/server connections which can be maintained at any time is much increased and is not limited by the number of servers which can be provided; reducing the need and processing overhead for breaking connections upon completion of all currently requested tasks from a client and reestablishing a connection at the instance of another request.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of performing a remote procedure call from a remote procedure call client on a first data processor by a server running on a second data processor, said second data processor including a remote procedure call transaction manager, said method including the steps of starting a server independently of a remote procedure call by loading and initializing an application providing a service corresponding to a remote procedure call on said second data processor, establishing a connection between said remote procedure call client and a connection handle in said transaction manager, receiving at said transaction manager a representation of a remote procedure call over said connection, transferring said remote procedure call and said connection handle from said transaction manager to an available server by said transaction manager in order of receipt and independently of said step of establishing a connection, and controlling said server to communicate a result of said remote procedure call to said client in accordance with said connection handle and return said connection handle to said transaction manager.

2. A method as recited in claim 1, including the further step of starting another server at said second data processor when the number of requests awaiting assignment of a server exceeds a configuration value.

3. A method as recited in claim 2, including the further step of stopping an idle server at said second data processor after a time delay by unloading from said second data processor said application corresponding to said idle server.

4. A method as recited in claim 3, wherein said time delay is set in accordance with an amount of time required for starting a server.

5. A method as recited in claim 2, including the further step of placing a representation of a remote procedure call in a queue.

6. A method as recited in claim 5, wherein said representation of a remote procedure call is a socket handle.

7. A method as recited in claim 2, including the further step of placing a remote procedure call in a queue.

8. A method as recited in claim 1, including the further step of logging server transactions.

9. A method as recited in claim 1, including the further step of time stamping completion of processing of a client request by a server.

10. A method as recited in claim 1, including the further step of processing an administrative command.

11. A transaction manager for a data processing network including a remote procedure call client at a first data processor and a resource at a second data processor, said transaction manager including means for starting a server providing a service corresponding to a remote procedure call on said second data processor by loading on said second data processor an application providing said service independently of a remote procedure call, means including a connection handle for establishing a connection between said remote procedure call client and said connection handle independently of said server, means for receiving a representation of a remote procedure call over said connection, means for transferring said remote procedure call including said connection handle to an available server in order of receipt and independently of said means for establishing a connection whereby said server is enabled to communicate a result of said remote procedure call to said remote procedure call client in accordance with said connection handle and return said connection handle to said transaction manager.

12. A transaction manager as recited in claim 11 further including means for starting an additional server at said second data processor when the number of requests awaiting assignment of a server exceeds a configuration value.

13. A transaction manager as recited in claim 12, further including means for stopping an idle server at said second data processor after a time delay by unloading from said second data processor said application corresponding to said idle server.

14. A transaction manager as recited in claim 13, wherein said time delay includes means for storing a configurable parameter.

15. A transaction manager as recited in claim 14, wherein said configurable parameter is set in accordance with an amount of time required for starting a server.

* * * * *